United States Patent [19]

Kuroda et al.

[11] Patent Number: 5,776,397
[45] Date of Patent: Jul. 7, 1998

[54] METHOD OF PRODUCING ZIRCONIA FUSED CAST REFRACTORIES

[75] Inventors: Ryunosuke Kuroda, Yokohama; Kazuyori Takatsuji, Takasago, both of Japan

[73] Assignee: Asahi Glass Company Ltd., Tokyo, Japan

[21] Appl. No.: 593,525

[22] Filed: Jan. 30, 1996

[30] Foreign Application Priority Data

Jan. 31, 1995 [JP] Japan .................. 7-014405

[51] Int. Cl.$^6$ .................................. B28B 1/54
[52] U.S. Cl. .............. 264/161; 264/297.6; 264/310; 264/311; 65/302
[58] Field of Search .................. 264/297.6, 310, 264/311, 161; 65/302

[56] References Cited

U.S. PATENT DOCUMENTS

| | | |
|---|---|---|
| 1,823,037 | 9/1931 | Fritzsche ................. 264/311 |
| 2,057,786 | 10/1936 | Mills ....................... 264/310 |
| 2,208,230 | 7/1940 | Rubissow . |
| 2,618,031 | 11/1952 | Mazer ...................... 264/311 |
| 3,632,359 | 1/1972 | Alper et al. . |
| 4,212,661 | 7/1980 | Jung . |
| 4,294,795 | 10/1981 | Haga et al. . |
| 4,336,339 | 6/1982 | Okumiya et al. . |
| 4,705,763 | 11/1987 | Hayashi et al. . |
| 5,023,218 | 6/1991 | Zanoli et al. . |
| 5,086,020 | 2/1992 | Ishino et al. . |
| 5,466,643 | 11/1995 | Ishino et al. . |

FOREIGN PATENT DOCUMENTS

540484   4/1946   United Kingdom .

*Primary Examiner*—James Derrington
*Attorney, Agent, or Firm*—Oblon, Spivak, McClelland, Maier & Neustadt, P.C.

[57] ABSTRACT

A method for producing zirconia fused cast refractories, which comprises casting zirconia fused cast refractories containing at least 33 wt % of a $ZrO_2$ component utilizing a mold, wherein the mold is rotated on a rotation axis, so that at least a portion of a meltage of raw material poured into the mold, is cooled to solidify under a centrifugal force of at least 1.2 G.

10 Claims, 6 Drawing Sheets

METHOD OF PRODUCING ZIRCONIA FUSED CAST REFRACTORIES

BACKGROUND OF THE INVENTION

1. Field of the Invention

The present invention relates to a method for producing zirconia fused cast refractories which are useful mainly for a floor or a side wall of a glass tank furnace, which is in contact with molten glass.

2. Discussion of Background

Fused cast refractories have a dense structure as compared with bonded refractories (usual fired refractories), and they are excellent in corrosion resistance by virtue of the dense structure. Therefore, fused cast refractories are used mainly at a portion of a furnace where a corrosion action is vigorous. Zirconia fused cast refractories are excellent particularly in a corrosion resistance against molten glass, and they are frequently used for a floor and a side wall of a glass tank furnace which is in contact with molten glass.

Fused cast refractories which are practically used, have a shape of a rectangular parallelpiped in many cases. However, at some portions such as corner portions of a glass tank furnace, a polyhedron having a larger number of faces than the rectangular parallelpiped (hexahedron), may be used. As refractories for a glass tank furnace, it is common to use refractories which have high corrosion resistance against molten glass and which are less likely to generate blisters in the molten glass, at a portion which is in contact with molten glass, so that no defects will be introduced into the glass as far as possible. Further, in a case where the refractories are inhomogeneous, they may be arranged so that the structural portion of the refractories which has high corrosion resistance against molten glass and which is less likely to form blisters in molten glass, is located on the side of molten glass.

As typical zirconia fused cast refractories useful for a glass tank furnace, so-called AZS type zirconia fused cast refractories comprising $ZrO_2$, $Al_2O_3$, $SiO_2$ and a small amount of an alkali component (for example, of a composition comprising from 33 to 41 wt % of $ZrO_2$, from 46 to 50 wt % of $Al_2O_3$, from 12 to 16 wt % of $SiO_2$ and from 0.3 to 1.8 wt % of alkali metal oxides) may be mentioned. Recently, demand for high quality glass has increased for e.g. electronic parts, and accordingly, use of high zirconia fused cast refractories containing from 88 to 97 wt % of a $ZrO_2$ component is increasing, which are excellent in the corrosion resistance against molten glass and which are believed to be less likely to introduce defects in glass by elution of the refractories into molten glass.

The AZS type zirconia fused cast refractories are composed of monoclinic $ZrO_2$ crystals (mineral name: baddeleyite; although they are monoclinic crystals at room temperature, they undergo transformation to tetragonal crystals at a high temperature), $\alpha$-$Al_2O_3$ crystals (corundum) and a $SiO_2$ rich matrix glass containing an alkali component. This matrix glass is present in the refractories as a glass having a proper viscosity in a temperature range of from 900° to 1200° C. within which $ZrO_2$ crystals undergo reversible crystal transformation from monoclinic crystals to tetragonal crystals accompanied with a volume change, and it functions as a cushion which absorbs and relaxes strains formed in the refractories due to the volume change of the $ZrO_2$ crystals and thus prevents formation of cracks in the refractories. The function performed by the matrix glass in the refractories, is the same also in the high zirconia fused cast refractories, and the property of the matrix glass for relaxing the strains is more important, since the amount of the matrix glass is relatively small.

Such zirconia fused cast refractories are usually prepared by a method which comprises charging a starting material prepared to have a predetermined chemical composition into an electric arc furnace provided with graphite electrodes, arc-melting the starting material, pouring the meltage into a mold made of e.g. graphite, having a predetermined internal size and having previously embedded in a thermal insulator, followed by cooling to solidify.

With zirconia fused cast refractory, when the meltage solidifies upon cooling, its volume decreases from 20 to 30%. Accordingly, an inlet port having a certain capacity, which is a so-called riser, is provided to supply the meltage to the portion shrinked upon solidification of the meltage. However, the supply of the meltage to the portion where the meltage solidified, will necessarily terminate, whereupon voids will be formed in the solidified refractory, whereby voids will be formed in the refractory. Such voids are usually present in a cluster at the upper center near the inlet port, where the meltage was introduced, of the fused cast refractories.

When zirconia fused cast refractories are to be used for a glass tank furnace, the presence of such void clusters impairs the useful life of the refractories and will be a cause for formation of defects in the glass. Accordingly, void free refractories (hereinafter referred to as VF refractories) obtained by cutting off the portion including void clusters (which usually extend to cover about 50 vol % of the cast refractories), are used for a glass tank furnace in many cases.

Various measures have been taken to improve the yield of the products and to produce high quality glass having no substantial defects such as blisters or stones. However, even if VF refractories of zirconia fused cast refractories containing from 88 to 97 wt % of a $ZrO_2$ component, which are regarded to be the best at present, are used after scraping off the surface formed during casting, it is still difficult to completely eliminate defects formed in the glass.

The present inventors have carefully examined the state where blisters generate in molten glass at the contact between the molten glass and the high zirconia fused cast refractories containing from 88 to 97 wt % of a $ZrO_2$ component. As a result, it has been found that in the dense structure of the high zirconia fused cast refractories, a slightly dark gray layer structure visually observed on a cross-sectional polished surface, having a thickness of at most 1 mm (hereinafter referred to as worm tracing or WT), is present, in which the matrix glass and fine voids (mostly not larger than 1 mm) are accumulated in a layer form, and a number of such WT are present along the surface of the refractories, which was in contact with a side surface of the mold during solidification of the high zirconia fused cast refractories. Further, such WT is likely to be a starting point of abnormal corrosion of the refractory, and it is also likely to be a point for generating blisters in molten glass.

Further, as a result of careful examination of the cross-sectional polished surface of the high zirconia fused cast refractories containing from 88 to 97 wt % of a $ZrO_2$ component, it has been found that no such WT is observed at the portion of the refractories located in a distance of from 6 to 8 cm from the lower surface of the refractories which was in contact with the bottom of the mold during solidification of the refractories.

SUMMARY OF THE INVENTION

It is an object of the present invention to provide zirconia fused cast refractories which are excellent in corrosion resistance against molten glass and which generate less blisters when contacted with molten glass and to provide a method for producing VF (void free) zirconia fused cast refractories in good yield.

The present invention has been made to accomplish the above objects and provides a method for producing zirconia fused cast refractories, which comprises casting zirconia fused cast refractories containing at least 33 wt % of a $ZrO_2$ component utilizing a mold, wherein the mold is rotated on a rotation axis, so that at least a portion of a meltage of raw material poured into the mold, is cooled to solidify under a centrifugal force of at least 1.2 G.

DETAILED DESCRIPTION OF THE PREFERRED EMBODIMENTS

In the production of VF refractories made of zirconia fused cast refractories containing at least 33 wt % of a $ZrO_2$ component useful for a glass tank furnace, if a centrifugal force of at least 1.2 G, which has never been present during casting of refractories by conventional methods, is applied, both the gravity and the centrifugal force will simultaneously be exerted to the meltage of refractories, whereby distribution of voids formed in zirconia fused cast refractories can be locally concentrated in a narrow portion in a direction opposite to the direction where the centrifugal force and the gravity are exerted.

According to the method of the present invention, the volume ratio of the portion where void distributions are locally concentrated in the refractories cast under application of the centrifugal force, can remarkably be made small, and the proportion of the cut off portion to obtain VF refractories (heretofore, the upper portion corresponding to at least ½ has been cut off) can be reduced to remarkably increase the yield of VF refractories. There is no technical problem with respect to applying a centrifugal force of a level of 10 G to a meltage within the mold. If a larger centrifugal force is applied, it is possible to further promote the transfer of the meltage containing a large amount of the $ZrO_2$ component having a large specific gravity to the surface of solidified phase.

In a case of refractories from which the major portion including voids will not be cut off, if the structural portion without voids is used on the side which will be in contact with molten glass of a glass tank furnace, they can be used as refractories having constant and excellent corrosion resistance for a long period of time until corrosion reaches the structural portion where voids are present.

If a too large centrifugal force is applied during solidification, a solidified phase containing a large amount of $ZrO_2$ crystals with a small content of the matrix glass phase which absorbs and relaxes strains, will be formed. With such a solidified phase, relaxing of the strains by the matrix glass can not adequately be performed when a temperature cycle is applied to cause crystal transformation of $ZrO_2$ crystals accompanying the volume change. In such a case, by exerting temperature cycles, the volume of refractories may increase (remaining volume increase), or cracks may occur in the refractories. Therefore, the centrifugal force exerted to the meltage is preferably from 1.5 to 3.5 G, particularly from 2.0 to 3.0 G.

The temperature of the meltage of the starting material for zirconia fused cast refractory to be poured into the mold is high at a level of at least 2000° C. Therefore, a care should be taken not to let the meltage scatter when the centrifugal force is applied to the mold charged with the meltage. The mold is required to have sufficient strength to be durable against the stress caused by the centrifugal force. Accordingly, it is preferred to use graphite as the material of the mold. The mold wall to receive the load of the meltage having the centrifugal force exerted thereto, is preferably disposed to be in parallel with the rotation axis, and to receive the force in the direction perpendicular to the mold wall as far as possible. Further, in order to adjust the solidification speed of the meltage at a proper level, the mold is surrounded by a thermal insulator. To prevent the thermal insulator from scattering at the time of rotation, it is preferred to hold the thermal insulator in a box made of a steel.

Solidification of the meltage starts at an instant when the meltage has been poured into a mold. In a case where a relatively small sized zirconia fused cast refractory is to be cast, the rotating momentum of the rotation apparatus to which the mold is attached, is small, it is possible to quickly bring the centrifugal force to a proper level by rotating the mold immediately after pouring the meltage. The rotational speed of the rotation apparatus is controlled by driving the rotating apparatus preferably with an inverter-controlled motor. For example, it is possible to change the rotational speed during the solidification of the meltage, so that a constant centrifugal force is always exerted at the surface of the solidified phase. However when a large sized refractory is to be cast, or when a plurality of refractories are to be cast simultaneously, it takes a long time for pouring the meltage, and the mold or the molds charged with the meltage, are heavy, whereby the rotating momentum for rotating the apparatus further increases, and the centrifugal force can not rapidly be brought to a proper level.

In a preferred method for producing zirconia fused cast refractories of the present invention, the inlet port of the mold for pouring the meltage of the starting material, is provided on the rotation axis, and the meltage of the starting material is poured to the inlet of the mold while the mold is rotating. By adopting this method, it is possible to exert a centrifugal force immediately after the meltage has been poured into the mold. Accordingly, even if the refractory to be cast is of a large size, or even if a plurality of refractories are to be cast simultaneously, a centrifugal force can be constantly exerted, and a refractory having a thick structure free from WT (explained later) can be constantly formed in the vicinity of the refractory surface which has been in contact with the mold wall located at the remotest side from the rotation axis.

In a preferred method for producing zirconia fused cast refractories of the present invention, a plurality of molds symmetrically disposed with respect to the rotation axis, are rotated around the rotation axis to cast the plurality of refractories simultaneously. If a plurality of refractories can be cast simultaneously, the productivity of refractories improves. In this case, in order to maintain the massbalance of the rotation apparatus, it is preferred to dispose the respective molds symmetrically with respect to the rotation axis of the rotation apparatus. When a plurality of molds are attached to the rotation apparatus, each mold will be necessarily located on one side of the rotation axis, and a centrifugal force will be exerted in the same direction throughout the interior of each mold.

In a preferred method for producing zirconia fused cast refractories of the present invention, the meltage of the staring material is the one containing from 88 to 97 wt % of $ZrO_2$ component. As the $ZrO_2$ staring material for the zirconia fused cast refractories, a material obtained by purifying a naturally produced baddeleyite ore, or a material obtained by removing $SiO_2$ component from zircon sand may be used. In such a commonly available $ZrO_2$ starting material, a $HfO_2$ component which exhibits properties almost equal to the $ZrO_2$ component when used as a refractory, is usually co-existent in an amount of about 1 wt %. In the present invention, the content of the $ZrO_2$ component in refractories is meant for the weight % of the total content of the $ZrO_2$ component and the $HfO_2$ component.

When the meltage of the starting material is the one containing from 88 to 97 wt % of the $ZrO_2$ component, and the centrifugal force to be exerted to the meltage during cooling for solidification is adjusted to be at least 1.5 G, it is possible to produce a zirconia fused cast refractory having a thick structural portion free from the above-mentioned WT which functions as a starting point for forming blisters in molten glass. The thickness will be at least 10 cm from the surface of the refractory (hereinafter referred to as surface A) which has been in contact with the side wall of the mold remotest from the rotation axis, when a centrifugal force of about 1.5 G is exerted.

If a high zirconia fused cast refractory is cast by a conventional method wherein no centrifugal force is exerted, there will be a structural portion free from WT in a thickness of from 6 to 8 cm at a lower portion of the refractory, which has been in contact with the bottom wall of the mold. The present inventors have considered that the reason for the formation of the structural portion free from WT is that the gravity has contributed to the transfer of the $ZrO_2$ component in the meltage. Namely, the density of the meltage having a large content of the $ZrO_2$ component is larger than the density of the meltage having a small content of the $ZrO_2$ component, whereby the gravity is believed to serve as a driving force to transfer the meltage containing a large content of the $ZrO_2$ component to the solidified phase surface composed mainly of the $ZrO_2$ crystals.

When a zirconia fused cast refractory containing from 88 to 97 wt % of a $ZrO_2$ component is cast, if the rising speed of the centrifugal force after pouring the meltage of the refractory into the mold, is slow, a few number of WT may be observed at a position which is apart only from 2 to 3 cm from the surface A of the refractory on the polished cross sectional plane which is vertical and perpendicular to the surface A. Wherein the plane divides the refractory approximately into two halves in a vertical direction. However, even with such a structural portion, the blister formation during the time of service in contact with molten glass is remarkably small as compared with the structural portion of the conventional refractory where many WT are observed.

Here, the vertical direction is based on the disposition during casting of the refractory. The same will apply in the following description.

In a preferred method for producing zirconia fused cast refractories of the present invention, the mold is the one having a casting space defined by mold surfaces constituting side surfaces of a quadrangular having a symmetrical axis, wherein a cross section of the casting space cut along a plane perpendicular to the symmetrical axis is a square or a rectangle close to a square, and the rotation axis of the mold coincides with the symmetrical axis.

The mold of this construction is structurally simple and easy to prepare. The centrifugal forces exerted in the vicinity of the four respective side surfaces of the mold will be substantially equal, and a plurality of symmetrical planes containing the rotation axis exist, whereby cooling and solidification of the meltage will proceed keeping a high level of symmetry.

In this casting space, the meltage shows no substantial flow traversing the symmetrical planes during solidification, whereby the structure in the refractory will maintain the symmetry. Especially when the meltage of the starting material contains from 88 to 97 wt % of a $ZrO_2$ component, it is possible to produce a high zirconia fused cast refractory wherein the dense structural portion free from WT is present up to the deeper position from the side surface of the refractory which has been in contact with the side wall of the mold, by applying the same level of the centrifugal force. The rectangle close to a square means that the ratio of the long side to the short side of the rectangle is not more than 1.2 and close to 1.0. Namely, even when the cross section cut in a direction perpendicular to the symmetrical axis of the quadrangular is a rectangle slightly depart from a square, no substantial change will be observed in the structure of the refractory after solidification, and it is possible to cast a refractory having a thick structural portion free from WT in the vicinity of the side surface of the refractory, which has been in contact with the side wall of the mold.

As one of the preferred variations of this method, a method may be mentioned in which the casting space of the mold is divided into two spaces by a mold wall formed vertically and perpendicular to the side surfaces of the quadrangular.

In another preferred method for producing zirconia fused cast refractories of the present invention, a refractory portion having a localized void cluster located in the vicinity of the inlet port, is cut off from a solidified body of a zirconia fused cast refractory cast under a centrifugal force. In this case, solidification proceeds under such a condition that a centrifugal force is exerted to the meltage, voids formed in the refractory will be locally concentrated at a portion having a small volume in the cast body, and by cutting off such a portion, the yield of the VF refractory can be remarkably increased.

The zirconia fused cast refractory of the present invention is preferably a zirconia fused cast refractory containing from 88 to 97 wt % of a $ZrO_2$ component and comprising a $ZrO_2$ crystal phase and a small amount of a $SiO_2$ rich matrix glass, wherein when rectangular test pieces each having polished surface of 1.6 cm×2.5 cm, which coincides with vertical cross-sectional plane perpendicular to a side surface of the refractory contacted with one side wall of a mold during solidification of the refractory and which divides the refractory approximately into two halves are scanned for inspection by electron irradiation spots having a diameter of about 100 μm of EPMA (electron probe micro analyzer), there exists no rectangular polished surface within 10 cm from said surface A of the refractory, wherein the proportion of electron irradiation spots detecting at least 50 wt % of the matrix glass within the scanned spots, is at least 3%.

Here, the cross sectional plane dividing the refractory approximately into two halves means that the volume of one of the two halves divided by the cross sectional plane is not less than ⅓ of the volume of the entire refractory.

In the present invention, EPMA having a function for elemental analysis, is used for evaluating the presence or absence of WT in the refractory structure. Firstly, an electron irradiation spot having a diameter of about 100 μm is irradiated to a structural portion composed solely of the matrix glass phase on the cut and polished surface of the refractory to be evaluated, to measure the intensity of X-rays (count number) specific to Si at the portion, whereupon the amount of the matrix glass at that portion is set to be 100 wt %. Otherwise, the intensity of X-rays (count number) specific to Zr at a portion composed solely of the $ZrO_2$ crystal phase in the refractory, is measured, whereby the content of the $ZrO_2$ component at this portion is set to be 100 wt %. Here, by properly adjusting the conditions of EPMA or by setting a proper coefficient, the count number at the concentration of 100 wt % can be adjusted to a predetermined numerical value (for example, to 20,000 counts).

Then, an electron irradiation spot of EPMA having a diameter of about 100 μm is scanned over the polished surface of a test pieces which coincides with the cross sectional plane passing through the rotation axis and is perpendicular to the side surface of the refractory contacted with the remotest side wall of the mold during casting of the refractory and which divides the refractory approximately into two halves in a vertical direction. An electron irradiation spot wherein the amount of the matrix glass is at least 50 wt %, or the content of the $ZrO_2$ component is at most 50 wt % is hereinafter referred to as a W spot. Elemental analysis by the electron irradiation spot, is carried out, for example, by scanning the electron irradiation spot on the polished cross-sectional surface at an interval of every 0.1 mm to detect the W spot.

Here, on the assumption that the count number of the characteristic X-ray is in a proportional relation with the content of the specific element. If an electron irradiation spot irradiated on the surface of a test specimen and the count number of X-ray specific to Si is at least 50% of the count number at the time of 100 wt %, such a spot is regarded as a W spot wherein the amount of matrix glass is at least 50 wt %. Likewise, if the count number of the X-ray specific to Zr is at most 50% of the count number at the portion composed solely of $ZrO_2$ crystals, such a spot is regarded as a W spot wherein the content of the $ZrO_2$ component is at most 50 wt %. In the present invention, an electron irradiation spot satisfying either one of these conditions is regarded as a W spot. When a cross-sectional polished surface of a refractory is examined by this method, at the portion where WT is present, the matrix glass is concentrated and the content of the $ZrO_2$ component is small, whereby W spots are detected with a high frequency.

When a polished surface of 1.6 cm×2.5 cm (an area of 4 $cm^2$) of a test piece which coincides with vertical cross sectional plane, which is perpendicular to the surface of the refractory contacted with one mold wall, is inspected by naked eye observation and by scanning an electron irradiation spot having a diameter of about 100 μm by EPMA, WT is observed on the test surface wherein the proportion of the W spots on the polished surface exceeds 3%. Reversely, no WT is observed on a test surface wherein the proportion of W spots on the polished surface is less than 3%.

The polished surface of 1.6 cm×2.5 cm is a surface of a test piece employed for the convenience for the examination by EPMA, the results will be the same when the examination is made with respect to a polished surface of a test piece sized 2.0 cm×2.0 cm. Thus, with the zirconia fused cast refractory of the present invention, WT is not observed on a cross-sectional polished surface which coincides with the vertical cross-sectional plane, located at a distance within 10 cm from the surface of the refractory contacted with the mold wall remotest from the rotation axis during casting of the refractory. When the polished surface of the test piece is examined by scanning with an electron irradiation spot of EPMA, W spots will be detected at a proportion of less than 3% even at a portion of the refractory where WT is not observed. Namely, a W spot does not necessarily mean the presence of WT, and if W spots are distributed in a dispersed fashion, no WT will be present, and no WT will be visually observed on the polished surface. To cast a zirconia fused cast refractory without cracking, the presence of the matrix glass which provides a function of absorbing strains in the refractory caused by the crystal transformation of $ZrO_2$ crystals accompanying a volume change, is necessary. WT will be formed when the matrix glass is accumulated in a layer form at the time of solidification of the refractory, and at a portion of the refractory where WT exists, at least 3% of W spots will be detected on the polished surface of the test piece.

The zirconia fused cast refractory of the present invention is preferably a zirconia fused cast refractory containing from 88 to 97 wt % of a $ZrO_2$ component and comprising a $ZrO_2$ crystal phase and a small amount of a $SiO_2$ rich matrix glass, wherein when a polished surface which coincides with a vertical cross-sectional plane and is perpendicular to a surface of the refractory contacted with one side wall of a mold during casting of the refractory and which divides the refractory approximately into two halves, is inspected by naked eye observation, no WT is observed by the naked eye within 10 cm from said surface of the refractory. In WT, the $SiO_2$ rich matrix glass and fine voids are accumulated.

Here, fine voids are voids having a diameter within a range of from 1 μm to 1 mm observed especially in the structure of WT on the cross-sectional polished surface of the refractory. WT visually observed on the cross-sectional polished surface usually shows a slightly dark gray color as compared with the surrounding structure. However, it turns to light brown when heated as used for a glass tank furnace.

Formation of such WT is observed also in zirconia fused cast refractories in which the content of the $ZrO_2$ component is small. However, the presence of WT in a visually observable state is limited to zirconia fused cast refractories containing at least 88 wt % of the $ZrO_2$ component, and it has been found that blistering will occur when WT in zirconia fused cast refractories of this type is in contact with molten glass. Accordingly, the content of the $ZrO_2$ component has been defined to be at least 88 wt %. On the other hand, if the content of the $ZrO_2$ component in the refractory exceeds 97 wt %, cracking is likely to occur during casting of the refractory, whereby it tends to be difficult to produce a practically useful zirconia fused cast refractory. Therefore, the content of the $ZrO_2$ component has been defined to be at most 97 wt %.

Formation of WT in the zirconia fused cast refractory containing from 88 to 97 wt % of the $ZrO_2$ component, is considered to be attributable to the fact that when the meltage solidifies, the movement of the $ZrO_2$ component to the $ZrO_2$ crystal surface is slow. Namely, the temperature distribution at the time of solidification of the meltage in the mold, is such that the isothermal plane is generally in parallel with the surface of the mold. Solidification of the meltage starts at the surface of the mold where the temperature is low and progresses towards inside, whereby the surface of the resulting solidified phase is generally in parallel with the isothermal plane.

This solidified phase is composed mainly of $ZrO_2$ crystals, and in the vicinity of the $ZrO_2$ crystal surface, a $SiO_2$ rich meltage with a small content of the $ZrO_2$ component will be present as the $ZrO_2$ component has been consumed by the formation of the $ZrO_2$ crystals. For the formation of the solidified phase, it is necessary that the $ZrO_2$ component is supplied to the surface of the solidified phase, and formation speed of the $ZrO_2$ crystals at the solidified phase surface is determined by the movement of the $ZrO_2$ component to the solidified phase surface. However, since the viscosity of the $SiO_2$ rich meltage is high, the movement of the $ZrO_2$ component in such meltage is slow.

Therefore, cooling proceeds in such a state that formation of the solidified phase composed of the $ZrO_2$ crystals has been stopped, and crystallization of $ZrO_2$ crystals starts in a meltage at a position where the concentration of $ZrO_2$ component is large, which is slightly apart from the surface of the previously formed solidified phase composed of $ZrO_2$ crystals. Consequently, there will be a state in which the $SiO_2$ rich meltage is trapped in a layer form between one solid phase and another solid phase composed mainly of $ZrO_2$ crystals. The trapped layer-form meltage is further cooled, whereby the internal $ZrO_2$ component crystallizes in the form of dendrite and solidifies by cooling. Due to the volume decrease upon solidification, fine voids will be formed, and WT will be formed. If such a phenomenon occurs repeatedly during the solidification of the meltage, a number of WT will be formed along the solidified phase surface in the refractory. Such WT contains a relatively large amount of the $SiO_2$ component and a relatively small amount of the $ZrO_2$ component, whereby such portions are inferior in the corrosion resistance against molten glass, and such portions tend to be slight dark gray as impurity elements such as Fe and Ti are contained in a concentrated state. Further, such WT will be a starting point for blistering in molten glass.

The zirconia fused cast refractory containing from 88 to 97 wt % of the $ZrO_2$ component, wherein no WT is observed within 10 cm from a surface of the refractory contacted with one side surface of the mold during the casting of the refractory, has been prepared for the first time by exerting a centrifugal force to the meltage in the mold during solidification. Namely, by the application of the centrifugal force of at least 1.5 G which is larger than the gravity (although the degree of the required centrifugal force varies depending upon the casting conditions such as the cooling rate of the meltage or the size of the refractory to be cast), the $ZrO_2$ component is forcibly supplied to the solidified phase surface composed mainly of $ZrO_2$ crystals, whereby it is possible to obtain a zirconia fused cast refractory having a structure portion free from WT on a cross-sectional polished surface to a distance of at least 10 cm from a surface of the refractory contacted to one side wall of the mold, which structure portion is thicker than the thickness of such a structure portion formed solely by the gravity.

The zirconia fused cast refractories containing from 88 to 97 wt % of the $ZrO_2$ component of the present invention preferably have a rectangular parallelpiped shape or a shape close to a rectangular parallelpiped, so that they can readily be laid to construct a glass tank furnace. When the high zirconia fused cast refractories of the present invention are used for a glass tank furnace, and a glass tank furnace is constructed by disposing the refractories so that the side of the refractories having the thick structure portion free from WT is located on the inner side of the glass tank furnace, which will be in contact with molten glass, blisters formed in the molten glass caused by the refractory, will remarkably be reduced while the portion of the structure portion free from WT contacts with molten glass in the glass tank furnace. Accordingly, the quality of the glass product and the yield of the glass product will remarkably be improved.

Now, the present invention will be described in further detail with reference to Examples. However, it should be understood that the present invention is by no means restricted by such specific Examples.

EXAMPLE 1

Figure 1:
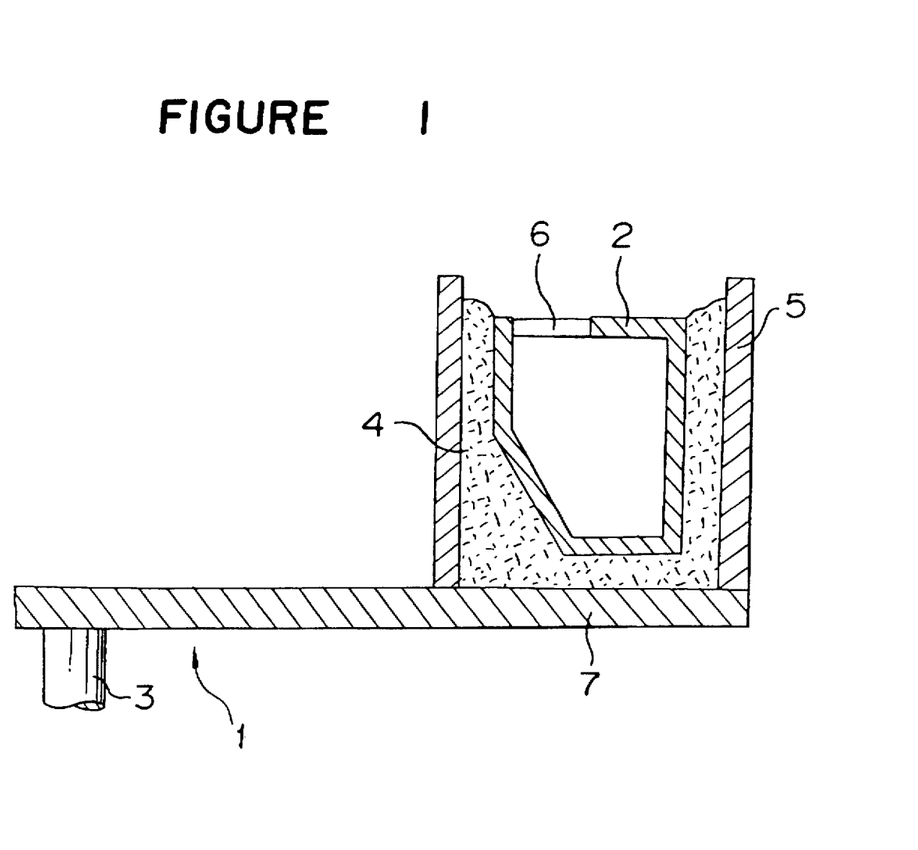
FIG. 1 is a vertical cross-sectional view of an embodiment of a centrifugal casting apparatus used for producing zirconia fused cast refractories in the Examples of the present invention.

FIG. 1 is a cross-sectional view showing a rotation apparatus 1 used for casting of a refractory in Example 1 and a mold 2 attached to the rotation apparatus 1, taken along the plane passing through the rotation axis 3. The mold 2 is made of a graphite plate having a thickness of about 3 cm. In FIG. 1, the cross-sectional shape of the casting space is pentagonal, and the mold has an internal thickness of 13 cm, an upper width of 26 cm, a lower width of 16 cm and a height of 35 cm and provided with an inlet port 6 of about 13 cm×13 cm at its top. This mold 2 was accommodated in a frame 5 secured to a rotary table 7 of the rotation apparatus 1 and embedded in a thermal insulator 4 made of Baeyer alumina. The mold 2 was fixed on the rotary table 7 so that the distance (the rotational radius) from the rotation axis 3 to the center of the remotest inner wall of the mold of 35 cm×13 cm became 92 cm. The rotation apparatus 1 is of the type capable of rotating at a maximum rotational speed of 60 rpm.

Using silica-removed zircon, zircon sand, Baeyer alumina and sodium carbonate as raw materials, a staring material mixture was prepared to have a composition comprising 93.0 wt % of $ZrO_2$, 4.5 wt % of $SiO_2$, 2.0 wt % of $Al_2O_3$ and 0.5 wt % of $Na_2O$, and about 70 kg of the starting material mixture was put into an electric arc furnace provided with two graphite electrodes and using a monophase current of 500 kVA as the power source and melted. This meltage was poured into the mold 2 from the inlet port 6 to fill the mold 2 with the meltage, whereupon a thermal insulator 4 and means for holding the thermal insulator (not shown) were attached at the top of the mold, and the rotation apparatus 1 was immediately put in operation. The rotational speed was increased to 54 rpm in about 10 seconds, and this rotational speed was maintained for 40 minutes. At that time, it was calculated that a centrifugal force of 3 G (2940 cm/s$^2$) was exerted at the center portion of the internal wall surface (the side surface of 130 mm×350 mm) of the mold remotest from the rotation axis. Then, the rotation was stopped, and the mold was left to cool for 2 days, whereupon a solidified zirconia fused cast refractory was taken out from the mold and cut for examination.

COMPARATIVE EXAMPLE 1

For the purpose of comparison, using the same mold 2 as used in Example 1, a zirconia fused cast refractory was cast under the same conditions as in Example 1 except that the mold was not rotated on the rotation apparatus, and the obtained refractory was cut and examined in the same manner as for the refractory of Example 1.

Figure 2:
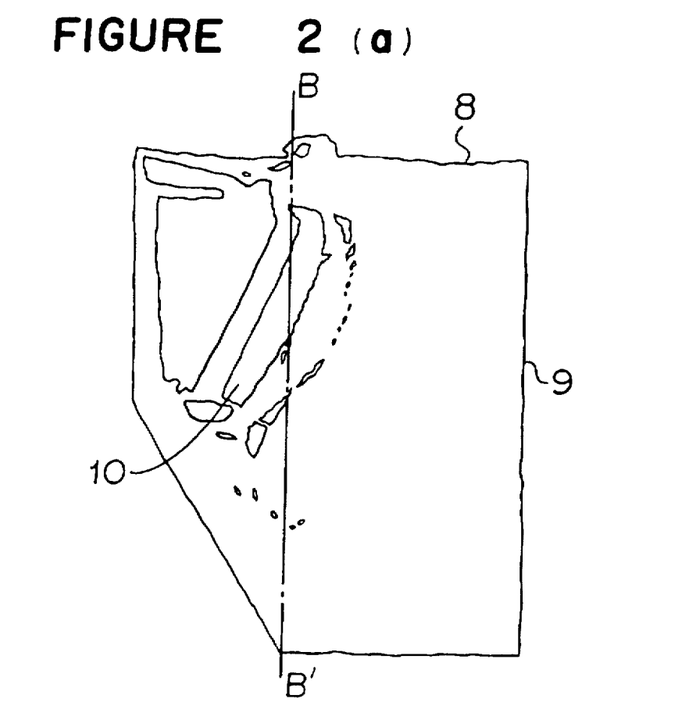
FIGS. 2(a) and 2(b) present vertical cross-sectional views showing distributions of voids in zirconia fused cast refractories in an Example of the present invention and a Comparative Example.

The refractory of Example 1 was cut along the plane in a vertical direction (based on the disposition at the time of casting, the same applies hereinafter) perpendicular to the surface A 9 of the refractory which was in contact with the inner wall surface of the mold at which the maximum centrifugal force was applied, containing the rotation axis 3, and the cross section was inspected by naked eye observation. FIG. 2a is a cross-sectional view of the refractory cast in Example 1 and illustrates the distribution of voids 10 observed on the cross section of the refractory 8. To obtain a VF refractory from this refractory, a left hand side portion may be cut off along the plane of B—B'.

Likewise the refractory 8' of Comparative Example 1 was cut approximately into two halves along a plane in a vertical direction perpendicular to the side surface 9' (hereinafter referred to as surface A') of the cast refractory which was in contact with the same inner wall surface of the mold, and the cross section was inspected. FIG. 2b illustrates the cross section of the refractory of Comparative Example 1. It is apparent from FIGS. 2(a) and 2(b) that in the refractory of Comparative Example 1, the internal voids are distributed in a scattered fashion at the upper portion, whereas in the refractory of Example 1, the voids are locally concentrated in the vicinity of the upper inlet port close to the rotation axis. The example shown in FIGS. 2(a) and 2(b) is an example in which the refractories contain 93.5 wt % of $ZrO_2$. However, the effect of the present invention for localizing the void distribution by an application of a centrifugal force is likewise observed with respect to an AZS type fused cast refractory.

Figure 3:
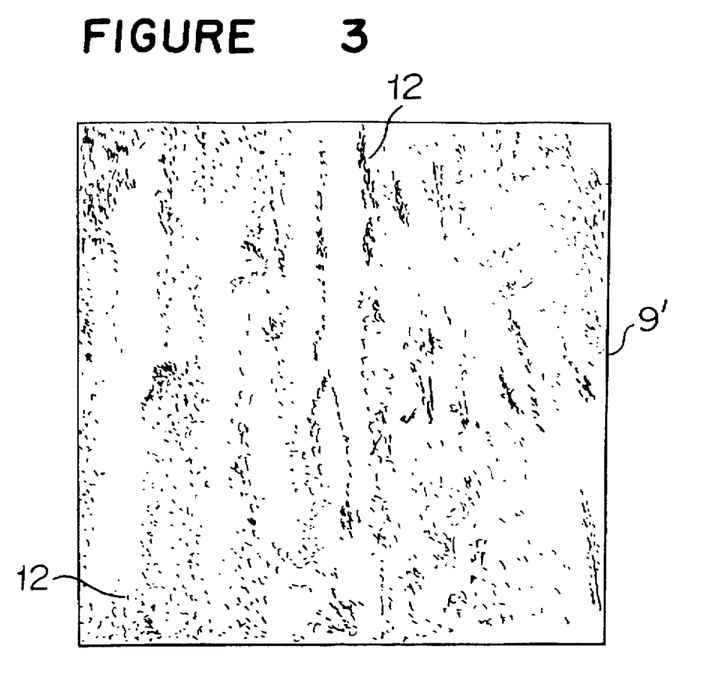
FIG. 3 is a view illustrating the distribution of W spots as detected by scanning a cross-sectional polished surface cut in a vertical direction and perpendicular to the mold surface (A' surface) of a conventional zirconia fused cast refractory with electron spots of EPMA.

FIG. 3 is a view (enlarged 1.5 times) showing a distribution of W spots prepared by plotting on a chart paper detected by scanning a cross-sectional polished surface, with an electron irradiation spot having a diameter of 100 μm of EPMA, the cross sectional polished surface is vertical and perpendicular to the surface A' 9' of the refractory 8' of Comparative Example 1. The Figure shows that a number of WT 12 wherein W spots are gathered in striae, are present substantially in parallel with the surface A' 9'. Whereas, in the refractory of Example 1, no WT was observed on the cross-sectional polished surface of the refractory to a position within about 13 cm from the surface A. (However, many WT was observed on the cross-sectional polished surface on the side near to the rotation axis of the refractory of Example 1, exceeding 13 cm from the surface A.)

Figure 4:
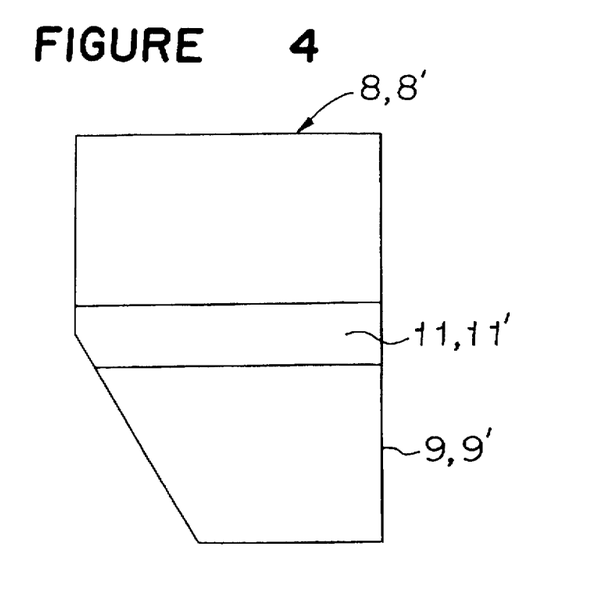
FIG. 4 is a vertical cross-sectional view of a refractory illustrating the position at which a test sample was taken for evaluating the refractory prepared in an Example of the present invention and a Comparative Example.

Then, as shown in FIG. 4, from the refractories of Example 1 and Comparative Example 1 cut in a perpendicular direction, plates 11 and 11' having a thickness of about 5 cm (size: 65 mm×260 mm) were cut out at a position of about ½ of the height, and from the surface A 9 and the surface A' 9' of these plates 11 and 11', test pieces (a1 to a5 and b1 to b5) having a thickness of 1 cm, a width of 2.5 cm and a length of 5 cm (the length corresponds to the thickness of the plate 11 or 11') were sequentially sampled. The surfaces of 2.5 cm×5 cm of these test specimens were polished with a diamond paste, and carbon was vapor-deposited on the polished surfaces in vacuum, and surfaces of 2.5 cm×1.6 cm (area of 4 cm$^2$) at their centers were scanned for examination by an electron irradiation spot having a diameter of about 100 μm by means of EPMA (a wavelength dispersive type EPMA having a function for analyzing elemental concentration, electron accelerating voltage: 15 kV, sample current: $5\times10^{-8}$ nA).

In this analysis, the proportion (%) of W spots among scanned electron irradiation spots having a diameter of about 100 μm, was measured with respect to the polished surface of each test piece. The obtained results are shown in Table 1 (Example 1) and Table 2 (Comparative Example 1).

TABLE 1

| Test specimens | a1 | a2 | a3 | a4 | a5 |
|---|---|---|---|---|---|
| Distance from surface A (cm) | 0–2.5 | 2.5–5.0 | 5.0–7.5 | 7.5–10.0 | 10.0–12.5 |
| Proportion of W spots (%) | 0.35 | 2.75 | 1.35 | 2.35 | 1.78 |
| WT | Nil | Nil | Nil | Nil | Nil |

TABLE 2

| Test specimens | b1 | b2 | b3 | b4 | b5 |
|---|---|---|---|---|---|
| Distance from surface A' (cm) | 0–2.5 | 2.5–5.0 | 5.0–7.5 | 7.5–10.0 | 10.0–12.5 |
| Proportion of W spots (%) | 3.12 | 3.56 | 4.86 | 3.25 | 6.68 |
| WT | Present | Present | Present | Present | Present |

In Example 1, the proportion of W spots in the test surface of a1 is remarkably small as compared with the test surface of b1. This is attributable to the fact that the centrifugal force was applied to the meltage when the solidification had not yet proceeded very much (only about 1 cm) from the surface A after pouring the meltage into the mold. Further, although the difference is small between the proportion of W spots on the polished surface b2 and the proportion of W spots on the polished surface of a2, the presence or absence of WT was clear by naked eye observation, and WT was clearly observed on the test surface of b2, while no WT was observed on the polished surface of a2. Namely, no WT is present on the polished surface of a2 where the matrix glass is distributed in a scattered fashion.

Table 1 shows no data with respect to the portion apart exceeding 12.5 cm from the surface A 9 of the refractory 8 of Example 1. However, on the cross-sectional polished surface of the refractory 8 apart exceeding 13 cm from the surface A 9 of the refractory 8, the proportion of W spots was at least 3%, and WT was observed.

Cylindrical samples were taken from the plates 11 and 11' and from the bottom of the respective refractories of Example 1 and Comparative Example 1 to investigate the physical properties of the refractories. Namely, cylindrical samples (c1 to c4 and d1 to d4) having a diameter of 3 cm and a height of 3 cm were taken from the portions located at distances of from 0 to 3 cm, from 3 to 6 cm, and from 6 to 9 cm, from the surface A or the surface A', and from the center of the bottom of each refractory (c4 and d4). With respect to each cylindrical sample, the porosity and the bulk density were measured. The results of the measurement are shown in Table 3. From the results in Table 3, it is evident that the porosity is relatively small and the bulk density is high with the refractory portion where no WT was observed.

TABLE 3

| Cylindrical samples | c1 | c2 | c3 | c4 | d1 | d2 | d3 | d4 |
| --- | --- | --- | --- | --- | --- | --- | --- | --- |
| Porosity (%) | 0.74 | 0.67 | 1.23 | 0.88 | 0.85 | 1.53 | 1.62 | 0.61 |
| Bulk density | 5.32 | 5.39 | 5.37 | 5.32 | 5.26 | 5.29 | 5.29 | 5.31 |

Angular samples were taken from the plates 11 and 11' from which test pieces a1 to a5 and b1 to b5 were taken, to investigate the corrosion resistance of the refractories. Namely angular samples having a cross section of 1.5 cm×1.5 cm and a height of 5 cm were, respectively, taken from positions of from 0 to 1.5 cm, from 1.5 to 3.0 cm and from 3.0 to 4.5 cm, from the surface A and the surface A', adjacent to the above test pieces.

Then, in a platinum crucible, a cullet of alkali free aluminosilicate glass (the melting temperature is high and highly corrosible) was put, and the respective angular samples were inserted in the platinum crucible in a vertical position and maintained at 1600° C. for 40 hours, whereupon the respective angular samples were withdrawn and cooled to room temperature. Then, the angular samples were cut in a longitudinal direction along their centers, whereupon the corroded depth of the most severely corroded portion (both sides in the cross section) located at the flux line of the molten glass (the molten glass surface) was measured at both sides of the cross section, and the average corroded depth was obtained. The obtained results (Example 1: e1 to e3, Comparative Example 1: f1 to f3) are shown in Table 4. From the results in Table 4, it is apparent that the refractory at the portion where no WT exists, is excellent also in the corrosion resistance against molten glass.

TABLE 4

| Angular samples | e1 | e2 | e3 | f1 | f2 | f3 |
| --- | --- | --- | --- | --- | --- | --- |
| Average corroded depth (mm) | 0.49 | 0.49 | 0.44 | 0.67 | 0.72 | 0.71 |

To examine the blistering properties of the refractories, samples were taken from the plates 11 and 11' adjacent to the above-mentioned test pieces. Namely, disc samples having a diameter of 3.0 cm and a height of 1.0 cm (g1 to g3 and h1 to h3) were, respectively, taken from positions of from 0 to 3.0 cm, from 3.0 to 6.0 cm and from 6.0 to 9.0 cm from the surface A and the surface A'. Then, each disc sample was put in a crucible (inner diameter: 30 mm, depth: 15 mm) prepared by cutting and grinding a zirconia fused cast refractory containing 93.5 wt % of $ZrO_2$, and a cullet of soda lime glass (sheet glass) was placed on each disc sample so that when the cullet melted, a molten glass layer having a thickness of 5 mm would be formed on the disc sample, and heated at 1400° C. for 48 hours.

Formation of gas bubbles was observed by a video recorder over a period of 48 hours at a region of 2 $cm^2$ at the upper center of each disc sample, and the number of blisters (mostly the diameter being within a range of from 0.05 to 0.3 mm) generated from the surface of each disc sample, was counted. The number of blisters generated from the surface of each disc sample was determined as the number of gas bubbles generated per $cm^2$ of the surface for a period of 24 hours. The results are shown in Table 5.

TABLE 5

| | Disc samples | | | | | |
| --- | --- | --- | --- | --- | --- | --- |
| | g1 | g2 | g3 | h1 | h2 | h3 |
| Distance from surface A or surface A' (cm) | 0.0–3.0 | 3.0–6.0 | 6.0–9.0 | 0.0–3.0 | 3.0–6.0 | 6.0–9.0 |
| Number of blisters (/cm²/day) | 0 | 0.5 | 0.5 | 2.0 | 3.0 | 2.5 |
| WT | Nil | Nil | Nil | Present | Present | Present |

From the results of the observation shown in Table 5, it is apparent that with the refractory portion free from WT of Example 1, blistering in contact with molten glass is remarkably small as compared with the refractory portion of Comparative Example 1 where WT was observed.

EXAMPLES 2 and 3

Figure 5:
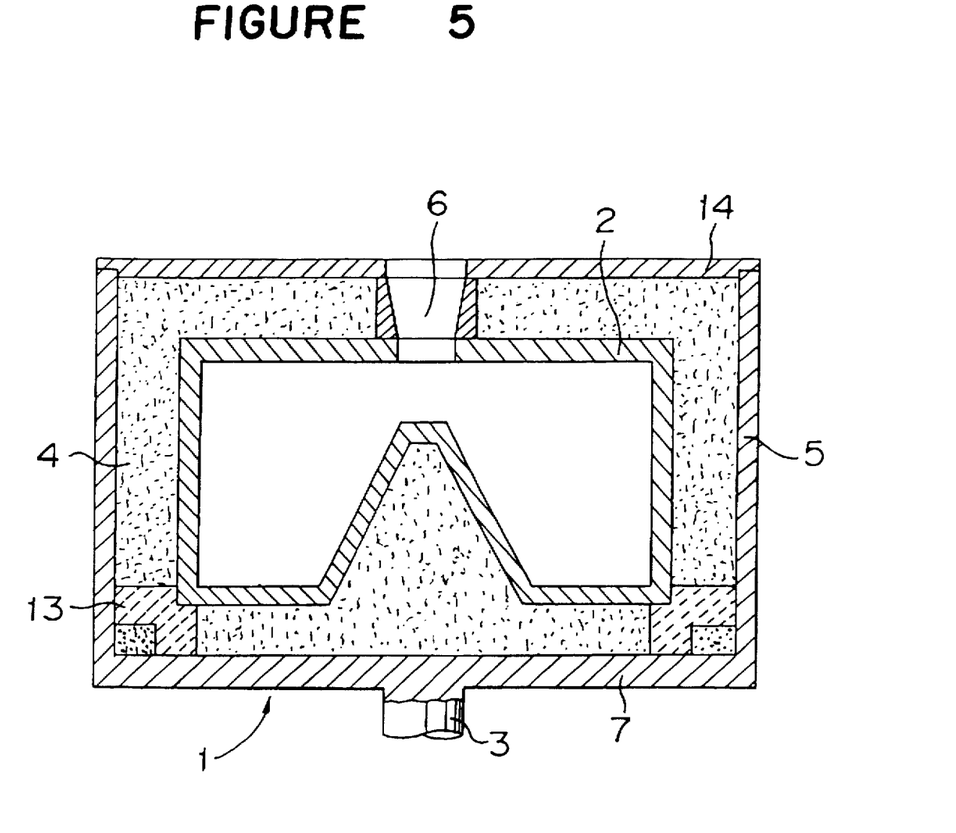
FIG. 5 is a vertical cross-sectional view of an embodiment of an apparatus for producing zirconia fused cast refractories, to be used in the present invention.

FIG. 5 is a vertical cross-sectional view illustrating an embodiment of a centrifugal casting installation used in Examples 2 and 3, wherein a pair of molds are provided on both sides of the rotation axis. In FIG. 5, reference numeral 3 indicates the rotation axis, numeral 2 a graphite mold, numeral 4 a thermal insulator, numeral 5 a box accommodating the thermal insulator and the molds, numeral 6 an inlet port provided at an upper part of the rotation axis 3, numeral 13 a fixing means for the molds, and numeral 14 a cover. Molds 2 having the same size are provided in the same way at the symmetrical positions with respect to the rotation axis 3, and the meltage of the starting material poured to the inlet port 6 is designed to flow into both molds 2 from the same inlet port 6. The rotation axis 3 of the rotation apparatus 1 of this FIG. 5 is driven by an inverter-controlled motor.

By using the casting installation of this construction, it is possible to cast refractories under such a condition that a centrifugal force is constantly applied, by supplying the meltage of the starting material from the inlet port 6 into the rotating molds 2. Accordingly, a large amount of meltage of the starting material can be supplied from e.g. an electric arc furnace, whereby high quality zirconia fused cast refractories can be produced with good productivity.

The centrifugal casting installation used in Examples 2 and 3 was set so that the distance from the rotation axis to the remotest side wall of the molds was 31.1 cm, and the internal dimension of each mold was such that the height was 35 cm, the thickness was 13 cm and the width (in the radial direction) was 26 cm. In Example 2, the molds were rotated at a rotational speed of 84.8 rpm, so that the centrifugal force exerted at the center portion of the surface A was 2.5 G, and the meltage of the starting material having the same composition as in Example 1 was poured from the inlet port 6 provided at the upper part of the rotation axis. The molds were cooled for about 1 hour while they were rotated at that rotational speed. Then, rotation of the molds was stopped, and they were left to cool for 2 days, whereupon the cast refractories were taken out from the molds. Further, in Example 3, the molds were rotated at a rotational speed of 120 rpm, so that the centrifugal force exerted at the center portion of the surface A was 5.0 G, and other conditions were set to be the same as in Example 2, whereby refractories were cast.

The refractories cast in Examples 2 and 3 were cut in a plane perpendicular to the surface A and containing the rotation axis. The respective cross sectional test pieces were polished and inspected by naked eye observation, whereby the structural portions free from WT were present up to distances of 11 cm and 12 cm, respectively, from the surface A. Then, from a portion near the center of the surface A of each refractory (the portion within 5 cm from the surface A and at a distance of about 2.5 cm from the center of the surface A), test pieces having a thickness of 1 cm, a width of 2.5 cm and a length of 5 cm to measure the proportion of W spots, disc samples having a diameter of 3 cm and a height of 3 cm to measure the porosity and the bulk density, angular samples of 1.5 cm×1.5 cm×5 cm to examine the corrosion resistance, angular plate samples having a hole with an inner diameter of 3.5 cm and depth of 1.5 cm formed at the center of the surface of 5 cm×5 cm of angular plates of 5 cm×5 cm×2.5 cm to examine formation of blisters, and test specimens of 4 cm×4 cm×4 cm to be subjected to a thermal cycle test, were, respectively, taken.

EXAMPLES 4 and 5

Figure 6:
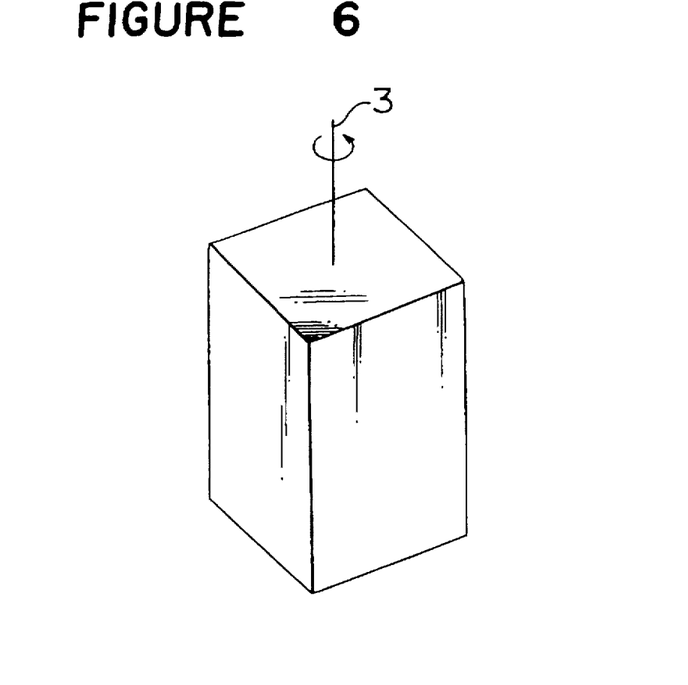
FIG. 6 is a perspective view showing the shape of a casting space of a mold for zirconia fused cast refractories to be used in the present invention and the disposition of the rotation axis.

FIG. 6 is a perspective view illustrating a casting space of a centrifugal casting mold having a rotational axis 3 at a symmetrical axis, which has a quadrangular casting space, of which the cross section perpendicular to the symmetrical axis, is a square. In this centrifugal casting mold, an inlet port is provided on the rotation axis, although not shown in the Figure. In Example 4, a mold having an inner space of FIG. 6 and having a distance from the rotation axis to the surface A being 14.3 cm, was used, and the meltage having the same composition as in Example 1 was poured from the inlet port into the rotating mold at a rotational speed of 108 rpm so that the centrifugal force at the center of the surface A would be 1.875 G, and other conditions were set to be the same as in Example 2, whereby a refractory was cast.

In Example 5, the same centrifugal casting mold as used in Example 4, was used, and the mold was rotated at a speed of 125 rpm so that the centrifugal force at the center of the surface A would be 2.5 G, and other conditions were set to be the same as Example 4. Each of the refractories cast in Examples 4 and 5 was cut along a vertical plane perpendicular to the surface A and containing the rotation axis. This cross sectional plane which coincides with the vertical plane was polished and inspected by naked eye observation, whereby the thickness of the structural portion free from WT was 10 cm and 12.5 cm, respectively, from the surface A.

From the refractories cast in Examples 4 and 5, test specimens were taken in the same manner as in Example 2. Further, also with respect to the refractories cast in Example 1 and Comparative Example 1, test specimens were taken in the same manner as in Example 2 and subjected to the following tests. However, with respect to the refractory cast in Comparative Example 1, test specimens were taken from a position based on the surface A' but not the surface A.

For the corrosion test and the blistering test employing molten glass, a cullet of glass for television color panel was used. Namely, in the corrosion test, in a platinum crucible, a cullet of glass for television color panel was put, and the angular samples were placed in a vertical position in the crucible and heated at 1500° C. for 72 hours, and then the respective angular samples were withdrawn from the crucible, cooled and then cut in a vertical direction through the center, and the corrosion depth at both sides of the flux line of the cross section, was measured, and the average value was obtained.

The blistering test was carried out in the following manner. Namely, in a hole having an inner diameter of 3.5 cm and a depth of 1.5 cm provided on one side of the sample, a cullet for television color panel glass was put in such an amount that when the glass melted, it would have a thickness of 5 mm, and it was heated at 1400° C. in an electric furnace and maintained for 48 hours. Then, it was cooled at a rate of 30° C./hr, and the number of blisters remaining in the glass having a diameter of 3.5 cm after cooling, was counted under a binocular microscope, excluding blisters present at the side wall portion of the hole. Most of the blisters observed in the glass had their diameters within a range of from 0.05 to 0.3 mm.

The thermal cycle test was carried out in the following manner. Namely, firstly, the dimensions of test specimens of 4 cm×4 cm×4 cm taken from the respective refractories were measured by means of calipers. The respective test specimens were put in an electric furnace, and a temperature cycle of heating from 800° C. to 1250° C. in a period of one hour and cooling from 1250° C. to 800° C. in a period of one hour, was repeated 40 times. After cooling, the dimension of each test specimen withdrawn from the electric furnace was measured by means of calipers, and from the dimensional change, the remaining volume expansion of each test specimen was determined.

The measurement of the proportion of W spots by EPMA was carried out in the following manner. Namely, a test piece of 1 cm×5 cm×5 cm having a polished surface of 5 cm×5 cm was prepared. The polished surface coincides with the vertical cross sectional plane perpendicular to the surface A containing the rotation axis (the cross-sectional polished surface is within 5 cm from the surface A and having one side being in contact with the center of the surface A), and the cross-sectional polished surface of 2 cm×2 cm at the center of this test piece was scanned with an electron irradiation spot having a diameter of about 100 μm. Among the scanned electron irradiation spots, those wherein the $ZrO_2$ concentration was at most 50%, were regarded as W spots, and the proportion of W spots on the cross sectional polished surface of 2 cm×2 cm was obtained. The results of the examination with respect to the respective refractories are shown in Table 6.

TABLE 6

| | Comparative Example | Examples | | | | |
|---|---|---|---|---|---|---|
| | 1 | 1 | 2 | 3 | 4 | 5 |
| Centrifugal force at surface A (G) | 0 | 3.0 | 2.5 | 5.0 | 1.875 | 2.5 |
| Apparent porosity (%) | 0.85 | 0.74 | 0.09 | 0.11 | 0.43 | 0.46 |
| Bulk density | 5.26 | 5.32 | 5.36 | 5.40 | 5.33 | 5.37 |
| Thickness of the layer free from WT (mm) | 12 | 120 | 110 | 120 | 100 | 125 |
| W spots (%) | 3.12 | 0.35 | 0.60 | 0.40 | 0.90 | 0.50 |
| Remaining volume expansion (%) | 6.9 | 12 | 9.9 | 14.7 | 8.7 | 10.8 |

TABLE 6-continued

|  | Comparative Example | Examples | | | | |
|---|---|---|---|---|---|---|
|  | 1 | 1 | 2 | 3 | 4 | 5 |
| Number of blisters | 30 | 13 | 15 | 12 | 13 | 14 |
| Corroded depth (mm) | 1.78 | 1.69 | 1.78 | 1.57 | 1.75 | 1.73 |

Figure 7:
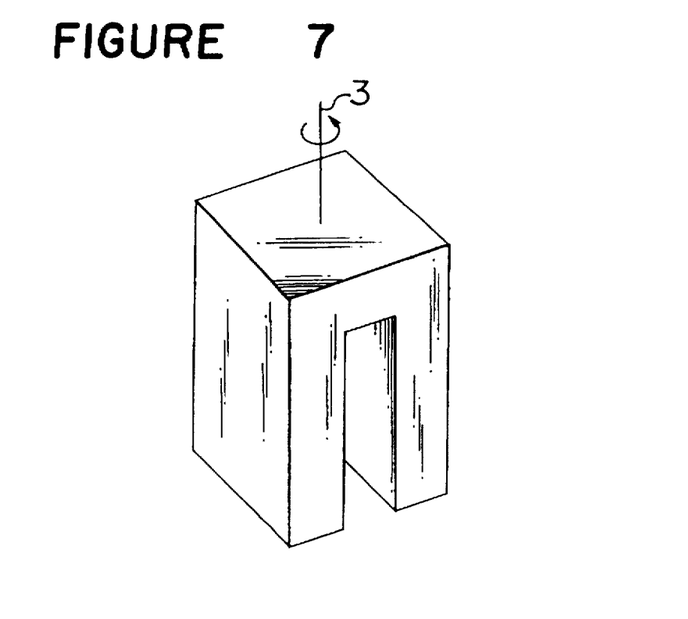
FIG. 7 is a perspective view illustrating another shape of a casting space of a mold for zirconia fused cast refractories to be used in the present invention and the disposition of the rotation axis.

FIG. 7 is a perspective view illustrating a casting space of a centrifugal casting mold, which was prepared by dividing the casting space of the centrifugal casting mold shown in FIG. 6 by a mold wall formed perpendicular to the side surfaces of the quadrangular, containing the symmetrical axis (which coincides with the rotation axis). In this mold, an inlet port was provided at an upper part of the rotation axis, although such is not shown in the drawing. By using the centrifugal casting installation of this construction, it is possible to cast two rectangular parallelpiped refractories having a dense and thick structure portion free from WT with good productivity.

Figure 8:
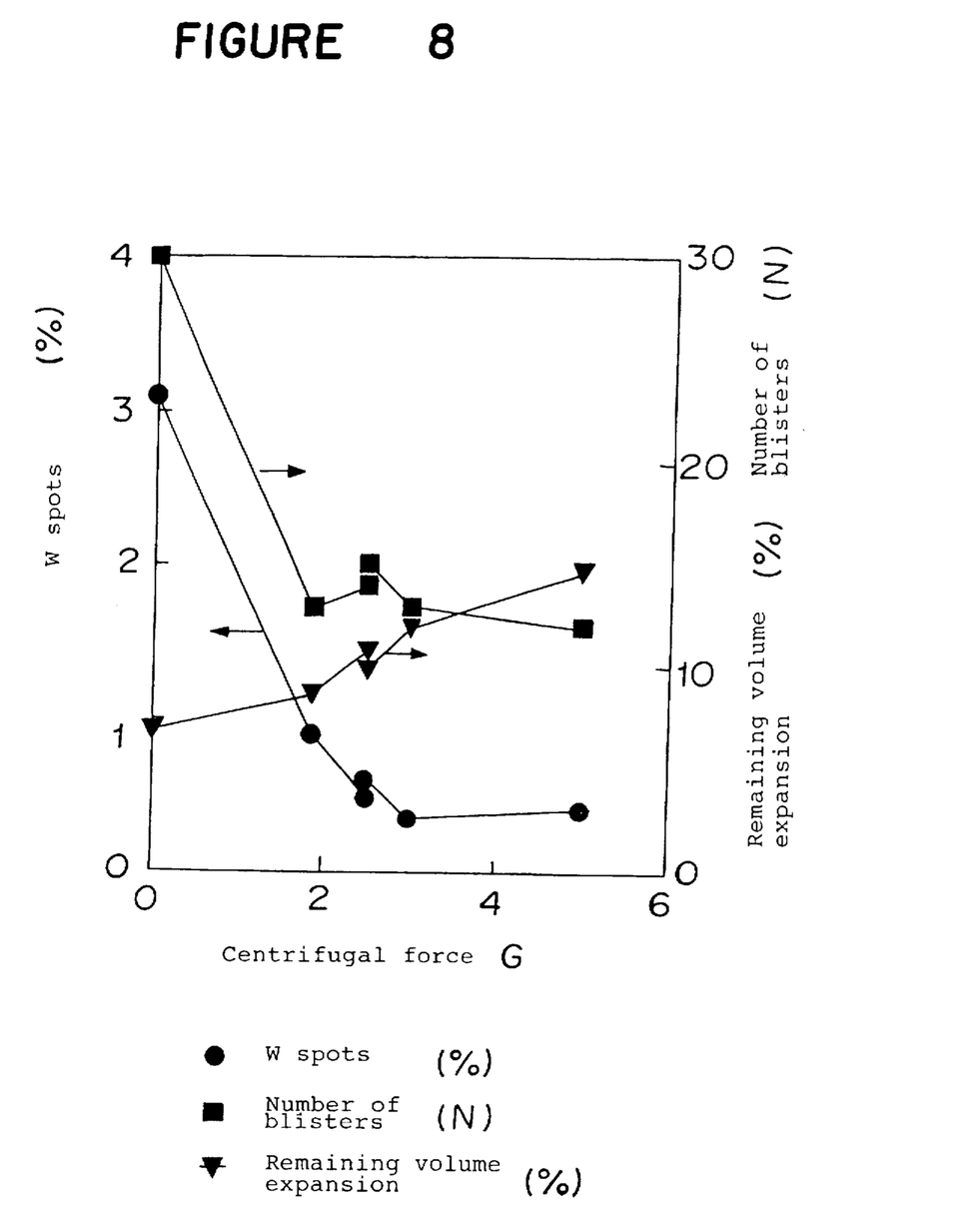
FIG. 8 is a graph showing influences of the centrifugal force exerted during solidification of high zirconia fused cast refractories over the structures and characteristics of the refractories.

FIG. 8 is a graph showing the relation between the degree of the centrifugal force exerted at the center of the surface A during the solidification and the proportion (%) of W spots, the number of blisters and the remaining volume expansion (%) from the results shown in Table 6. From this Figure, it is apparent that the proportion (%) of W spots and the number of blisters can remarkably be reduced by the application of the centrifugal force. However, if the centrifugal force applied increases, the remaining volume expansion tends to increase. If the remaining volume expansion is large, the volume of the refractory increases during its use, and cracking is likely to form in the refractory. It is apparent that application of a centrifugal force of from 1.5 to 3.5 G is preferred.

According to the method for producing zirconia fused cast refractories of the present invention, a centrifugal force of at least 1.2 G is applied to at least a portion of meltage in the mold. Thus, by this centrifugal force, void distribution formed in the refractories can be localized at a predetermined corner to be cut off, whereby the yield of the cast refractories can remarkably be improved. Further, by applying this method to refractories containing from 88 to 97 wt % of a $ZrO_2$ component, it is possible to produce high zirconia fused cast refractories which have dense and thick refractory portions free from WT which otherwise generate blisters in molten glass, near the mold wall (near the surface A) remotest from the rotation axis at which a large centrifugal force is applied.

The zirconia fused cast refractories of the present invention contain from 88 to 97 wt % of a $ZrO_2$ component, wherein WT is not observed within 10 cm from the surface A of the refractories. The portion having a structure free from WT which generate blisters in molten glass has high corrosion resistance. Accordingly, by using the refractory so that the thick structure free from WT is located on the molten glass side of a glass tank furnace, it is possible to remarkably reduce introduction of defects such as blisters and stones into the molten glass, and high quality glass products can be produced in good yield.

Improvement of the quality and the yield of glass products is remarkable when the zirconia fused cast refractories of the present invention are used at required portions of a glass tank furnace for producing glass products of high quality, such as glass plates to be used for various electronics parts as well as for windows of buildings.

What is claimed is:

1. A method for producing zirconia fused cast refractories, which comprises casting zirconia fused east refractories containing at least 33 wt % of a $ZrO_2$ component utilizing a mold, wherein the mold is rotated on a rotation axis, so that at least a portion of a meltage of raw material poured into the mold is cooled to solidify under a centrifugal force of at least 1.2 G, thereby forming a localized void cluster in the vicinity of an inlet port.

2. The method for producing zirconia fused cast refractories according to claim 1, wherein the centrifugal force is from 1.5 to 3.5 G.

3. The method for producing zirconia fused cast refractories according to claim 1, wherein an inlet port of the mold for pouring the meltage of raw material is provided on the rotation axis, and the meltage of raw material is poured to the inlet port of the mold while the mold is rotating.

4. The method for producing zirconia fused cast refractories according to claim 3, wherein a plurality of molds disposed symmetrically with respect to the rotation axis, are rotated around the rotation axis to cast a plurality of refractories simultaneously.

5. The method for producing zirconia fused cast refractories according to claim 1, wherein the meltage of raw material is the one containing from 88 to 97 wt % of the $ZrO_2$ component.

6. The method for producing zirconia fused cast refractories according to claim 3, wherein the mold is the one having a casting space defined by mold surfaces constituting side surfaces of a quadrangular shape having a symmetrical axis, wherein a cross section of the casting space cut along a plane perpendicular to the symmetrical axis is a square or a rectangle close to a square, and the rotation axis of the mold coincides with the symmetrical axis.

7. The method for producing zirconia fused cast refractories according to claim 6, wherein the casting space of the mold is divided into two spaces by a mold wall formed vertically and perpendicular to the side surfaces of the quadrangular shape.

8. The method for producing zirconia fused cast refractories according to claim 1, wherein a refractory portion having a localized void cluster located in the vicinity of the inlet port, is cut off from a solidified body after solidification of the meltage.

9. The method of claim 1, wherein at least a 10 cm thickness of said refractory is free from worm tracing, said 10 cm thickness of said refractory has been in contact with a sidewall of said mold, and said sidewall is remotest from said rotation axis.

10. A method for producing zirconia fused cast refractories, which comprises casting zirconia fused cast refractories containing at least 33 wt % of a $ZrO_2$ component utilizing a mold, wherein the mold is rotated on a rotation axis, so that at least a portion of a meltage of raw material poured into the mold is cooled to solidify under a centrifugal force of at least 1.2 G, thereby forming at least a 2.5 cm thickness of said refractory free from worm tracing, said 2.5 cm thickness of said refractory has been in contact with a sidewall of said mold, and said sidewall is remotest from said rotation axis, and wherein a refractory portion having a localized void cluster located in the vicinity of the inlet port, is cut off from a solidified body after solidification of the meltage.

* * * * *